Patented Aug. 27, 1940

2,212,831

UNITED STATES PATENT OFFICE 2,212,831

MANUFACTURE OF STABLE DERIVATIVE OF ADRENALINE

Ferdinand Hoffmann, Hohen-Neuendorf/Nordbahn, and Peter Marquardt, Berlin-Wilmersdorf, Germany, assignor to Byk-Guldenwerke Chemische Fabrik A.-G., Berlin, Germany, a corporation of Germany No Drawing. Application October 11, 1938, Serial No. 234,490. In Germany April 25, 1938

6 Claims. (Cl. 260—344)

This invention relates to manufacture of stable derivative of adrenaline; and it comprises a method of making a new compound of adrenaline and ascorbic acid wherein these compounds are reacted in the molar proportions of about 1 to 2, usually in the presence of an inert organic solvent, the resulting reaction product being recovered in crystalline form from the reaction mixture. The invention also includes the new compound as a composition of matter, said compound crystallizing in the form of needles having a melting point of about 184.5° C., being soluble in water and in alcohol, producing a coloration more intense than ascorbic acid when mixed with ferric chloride solution and a pink-carmine color, similar to that produced with adrenaline, when mixed with alkali, said compound producing adrenaline action, similar to that produced by the total suprarenal extract, but without producing the undesired secondary phenomena of the latter, and being stable to light and to air. In addition this invention includes the composition of matter produced by mixing said new compound with water and a sulfhydryl-redox system of the nature of cysteine-cystine and glutathione, said composition producing a physiological effect similar to that of a freshly prepared suprarenal total extract; all as more fully hereinafter set forth and as claimed.

It has long been known that pure 1-adrenaline, $3:4(OH)_2C_6H_3.CHOH.CH_2.NH.CH_3$ is unstable towards light and air. Many attempts have been made to stabilize this product, usually by the addition of the so-called redox systems (oxydation-reduction products). It has also been known that adrenaline can be stablized by the addition of albuminous compounds, for example, and that pure adrenaline can be recovered from such mixtures. This has led to the theory that the suprarenal capsules contain the effective principle in the form of albumin addition products.

It is also known that pure adenaline does not produce the same prolonged adrenaline effect which is produced by the use of the suprarenal total extracts. The latter extracts are objectional, however, since they produce undesired secondary effects, such as the irritation of the vagus. It has therefore long been a desideratum in this art to discover a product which is stable to light and to air, which provides the prolonged adrenaline effect of the total suprarenal extract and which does not produce the undesired secondary effects of this latter preparation. The present invention is believed to supply such a product.

It has been found that a new compound is produced by reacting together 1-adrenaline with ascorbic acid in the molecular proportions of about 1 to 2. This compound has been found substantially stable towards light and air and also in the applicatory tract. It produces the prolonged adrenaline action of the total suprarenal extract. It has no undesired secondary effects. This compound is characterized by the fact that its stability with respect to air and light is not increased by decrease of its effectiveness with respect to the living organism but, on the contrary, its effectiveness is apparently increased so that this compound is, in effect, an "activated adrenaline." The increase of effectiveness takes place in a desired manner.

The new product has been proved to be a new chemical individual by a determination of its constants, although its structure has not been definitely identified. It is not known whether this new compound is a true molecular compound or whether it is an anhydride-like or salt-like compound or possibly an additive compound. It is known, however, that the components of the new compound, that is, adrenaline and ascorbic acid, can be recovered from the compound with relative ease. As previously stated, the new compound shows an entirely unexpected, prolonged therapeutic effect, which resembles the effect produced by the total suprarenal extract. Owing to its high stability towards fermentation, per-oral administration is possible.

The new compound, in comparison with the total suprarenal extract, can be prepared much more easily and in much purer form, and also in unlimited quantities. It is more stable than these extracts and it does not possess their undesired secondary effects.

The process required to produce the new compound is rather simple. It is merely necessary to mix 1-adrenaline with ascorbic acid, in the approximate molar proportions of 1 to 2 and in the presence of a solvent, such as alcohol, which may dissolve the reaction ingredients. Methyl or ethyl alcohol can be used, for example. After the resulting reaction mixture has stood for a long time, snow white needles spontaneously form in the solution, these being crystals of the new compound. Spontaneous crystallization requires a considerable length of time, but, if the solution is inoculated, the crystals form readily and within a short time. Inoculation or seeding of the solution is desirable on account of the fact that, when working quickly, difficultly crystallizable, syrupy solutions are obtained. When working with water it has been found that the solutions obtained are very difficult to crystallize on account of their syrupy nature. It is therefore advantageous to perform the reaction and crystallization in lipoid solvents. Any type of inert organic solvent which forms crystallizable solutions can be employed.

The white crystals of the new product can be recovered from the solution by simple filtration or decantation. They are quite stable in the air and towards light. They can therefore be kept or stored without special protective measures and without danger of oxidation. These crystals are highly soluble in hot alcohol and, in cold alcohol, they are soluble up to concentrations of about 2 per cent by weight. The crystals appear to be soluble in water in almost any proportions.

If a solution of the new compound is mixed with ferric chloride solution and allowed to stand for an hour a coloration is obtained which is more intense than can be obtained with ascorbic acid alone. When the new compound is mixed with alkali a pink-carmine coloration is produced, similar to that formed with adrenaline, whereas ascorbic acid remains colorless under this treatment. The new compound has a melting point of about 184.5° C. When mixed in equi-molecular proportions with adrenaline a melting point of 135° is obtained. In contrast to this, it has been found that a mixture of 1 mole of 1-adrenaline with 2 moles of ascorbic acid has a melting point of 145° C. This indicates clearly that the new product is a definite chemical individual.

The new compound, when used therapeutically, is advantageously employed in the form of an aqueous solution mixed with a sulfhydryl-redox system, for example a mixture of cysteine and cystine, or glutathione. Any of the usual sulfhydryl-redox systems are suitable. These redox systems should be employed in the proportions of about 1 to 1, based on the weight of the ascorbic acid used in making the new compound.

While the more advantageous embodiments of this invention have been described it is obvious that the process of this invention can be modified in various ways within the skill of the art. In the reaction between the adrenaline and the ascorbic acid, for example, it is not necessary that sufficient alcohol or other solvent be present to completely dissolve the reaction ingredients. It is possible to produce this reaction in the presence of a minimum of solvent provided that the reaction components are ground together in a mortar, for example. And as mentioned previously any inert solvent for the reaction components which produces a crystallizable solution of the new compound may be employed. Other modifications within the scope of the following claims will be immediately evident to those skilled in this art.

What is claimed is:

1. In the manufacture of stable derivatives of adrenaline, the process which comprises reacting 1-adrenaline with ascorbic acid in the molecular proportions of about 1 to 2 and in the presence of an inert solvent, then recovering a crystalline reaction product from the solution.

2. In the manufacture of stable derivatives of adrenaline, the process which comprises mixing 1-adrenaline with ascorbic acid in the molecular proportions of about 1 to 2 and in the presence of a lipoid solvent, then crystallizing and recovering the resulting reaction product from the solution.

3. In the manufacture of stable derivatives of adrenaline, the process which comprises reacting 1-adrenaline with ascorbic acid in the molecular proportions of about 1 to 2 and in the presence of an inert organic solvent producing a crystallizable solution, then crystallizing the resulting reaction product and recovering the crystals from the solution by filtration.

4. The process of claim 3 wherein the reaction mixture is seeded by the introduction of crystals of the reaction product obtained from a previous crystallization.

5. The process of claim 3 wherein said inert organic solvent is an alcohol.

6. As a new article of manufacture, a crystalline reaction product of 1-adrenaline and ascorbic acid in the molecular proportions of about 1 to 2, said product having a melting point of about 184.5° C., being substantially stable to light and to air, being soluble in water and in alcohol, crystallizing from alcoholic solutions in the form of needles, producing a coloration with ferric chloride solution which is more intense than that produced with ascorbic acid and producing a pink-carmine coloration when mixed with alkali.

FERDINAND HOFFMANN.
PETER MARQUARDT.